(12) United States Patent
Shao et al.

(10) Patent No.: US 11,119,898 B1
(45) Date of Patent: Sep. 14, 2021

(54) AUTOMATIC CODE COVERAGE FILE RECOMMENDATION

(71) Applicant: International Business Machines Corporation, Armonk, NY (US)

(72) Inventors: Liujia Shao, Ontario (CA); Yan Luo, Concord (CA); Yan Xu, Richmond Hill (CA); Sibin Fan, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/868,593

(22) Filed: May 7, 2020

(51) Int. Cl.
G06F 11/36 (2006.01)
G06K 9/62 (2006.01)
G06F 8/71 (2018.01)

(52) U.S. Cl.
CPC ............ *G06F 11/3676* (2013.01); *G06F 8/71* (2013.01); *G06K 9/6218* (2013.01)

(58) Field of Classification Search
USPC ........................................................ 717/124
See application file for complete search history.

(56) References Cited

U.S. PATENT DOCUMENTS

| | | | |
|---|---|---|---|
| 8,627,287 B2 | 1/2014 | Fanning et al. | |
| 9,639,453 B2 | 5/2017 | Belur | |
| 10,642,726 B2 * | 5/2020 | Abhishek | G06F 11/3676 |
| 2007/0234309 A1 | 10/2007 | Davia et al. | |
| 2009/0144698 A1 * | 6/2009 | Fanning | G06F 11/3676 717/120 |
| 2009/0265693 A1 | 10/2009 | Bakowski | |
| 2016/0335555 A1 * | 11/2016 | Llanes-Tosar | G06F 17/16 |
| 2017/0132121 A1 * | 5/2017 | Cooper | G06F 11/3676 |
| 2018/0121337 A1 * | 5/2018 | Unsal | G06N 20/00 |
| 2019/0213115 A1 * | 7/2019 | Takawale | G06F 8/30 |

FOREIGN PATENT DOCUMENTS

| | | |
|---|---|---|
| CN | 107515826 A | 12/2017 |
| CN | 110413506 A | 11/2019 |

* cited by examiner

*Primary Examiner* — John Q Chavis
(74) *Attorney, Agent, or Firm* — Cantor Colburn LLP; Teddi Maranzano (57) ABSTRACT

Techniques for automatic code coverage file recommendation are described herein. An aspect includes receiving historical code coverage data. Another aspect includes clustering the historical code coverage data. Another aspect includes performing content filtering based on the clustered historical code coverage data to determine a content filtering preferred file list. Another aspect includes performing collaborative filtering based on the clustered historical code coverage data to determine a collaborative filtering preferred file list. Another aspect includes combining the content filtering preferred file list and the collaborative filtering preferred file list to determine a code coverage file recommendation list. Another aspect includes providing the code coverage file recommendation list to a user.

20 Claims, 7 Drawing Sheets

AUTOMATIC CODE COVERAGE FILE RECOMMENDATION

BACKGROUND

The present invention generally relates to computer software, and more specifically, to automatic code coverage file recommendation for computer software.

Software projects, such as enterprise software projects, are made up of software that is written by programmers. Typically, the programmer writes programs at the source code level. A compiler may then compile (i.e., build) the source code to generate object code that the system executes, and debug information that describes the object code for use by debuggers. Source code and Object code may include multiple modules, subroutines, objects, threads, functions, and other structures depending on the type of code. Code coverage tools record the results of systematic testing or exercising of these subroutines, objects, threads, functions, and other structures, and may enable debugger tools to assist programmers in locating the mistakes in the source code the programmers produced by allowing the programmers to inspect variables, memory, and registers and manipulate the execution of object code as described by the corresponding debug information.

SUMMARY

Embodiments of the present invention are directed to automatic code coverage file recommendation. A non-limiting example computer-implemented method includes receiving historical code coverage data. The method also includes clustering the historical code coverage data. The method also includes performing content filtering based on the clustered historical code coverage data to determine a content filtering preferred file list. The method also includes performing collaborative filtering based on the clustered historical code coverage data to determine a collaborative filtering preferred file list. The method also includes combining the content filtering preferred file list and the collaborative filtering preferred file list to determine a code coverage file recommendation list. The method also includes providing the code coverage file recommendation list to a user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide automatic code coverage file recommendation. In a development operations (DevOps) pipeline, which may include a continuous integration environment, code coverage data may be generated for each build of a software project. For an enterprise software project, each build may generate a relatively large number (e.g., thousands) of code coverage files. Although users, such as developers or testers, may be encouraged to verify whether each code coverage file satisfies code quality requirements, users may focus on only a relatively small subset of files of the code coverage data, which may result in some relatively important code coverage data not being verified. Automatic code coverage file recommendation may provide a user with a list of relevant code coverage files based on historical developer profiles and historical code coverage files, allowing a user to select one or more code coverage files for verification from the list. For example, if a user in an application development environment is verifying code coverage files for a particular build, instead of manually checking each code coverage file that was generated for the build, automatic code coverage file recommendation may recommend a list of relevant code coverage files for verification by the user, even if the user does not fully understand the code base of the application.

Automatic code coverage file recommendation may be performed based on a dataset including historical code coverage files and historical developer profile information. File type clustering may be performed to identify similarities between the historical code coverage files, and developer profile clustering may be performed to determine similarities between developers in the system. Collaborative filtering and content filtering may be performed based on the clustered data. Collaborative filtering may identify relevant code coverage files for a user based on the past behavior of other users, and content filtering may identify relevant code coverage files based on the past behavior of the user. The results of the collaborative filtering model and content filtering model may be combined into a combined code coverage file recommendation list. In some embodiments, the collaborative filtering model and content filtering model may adjust model parameters during operation based on evaluation of the recommendations output by the models. Embodiments of an automatic code coverage file recommendation system may be integrated into a source code coverage analysis tool for use by a software development team.

The developer profile information that is input into embodiments of automatic code coverage file recommendation may include any appropriate information, including but not limited to job roles, departments, projects, most familiar programing language(s), and historical code coverage file preferences of the developer. The developer profile information may be clustered to identify groups of similar developers, and collaborative filtering may use the preferences of the developer community (e.g., similar developer's choices) to select code coverage files for recommendation to a particular user. Any appropriate collaborative filtering algorithm may be used, including but not limited to k-nearest neighbors (KNN) recommendation algorithms and association rule mining. Similarities between developers may be identified based on the developer profile information. For example, developers in the same division that have a same job role may tend to focus on similar source code files when verifying code coverage data. Therefore, code coverage files may be identified for a user in the division by the collaborative filtering model based on the historical preferences of similar developers in the division.

The historical code coverage files that a user has previously preferred may also be analyzed by the content filtering model. Content filtering may determine the preferences of a user based on the user's past behavior, e.g., by estimating the user's preference for certain features of a code coverage file. For example, a code coverage file that has been accessed for verification by the user may contain particular features such as code coverage rates of important classes. Therefore, when a new abnormal code coverage dropdown is identified in a particular source code coverage file corresponding to the particular classes, the particular code coverage file may be included in the recommendation list for the user. The features of historical code coverage files may be extracted in any appropriate manner for use by the content filtering model; for example, term frequency-inverse document frequency (TF-IDF) may be used to encode text documents in multi-dimensional Euclidian space for clustering analysis. Static analysis rules may be used to analyze patterns of source code to generate feature vectors for the content filtering model.

The preferred file lists determined by collaborative filtering and content filtering may be combined into a ranked code coverage file recommendation list using a weighting or voting scheme in some embodiments. The weights may be learned dynamically in some embodiments. Evaluation of the performance of the ranker may be performed to improve system performance by adjusting parameters of the ranker. In order to improve the performance of the automatic code coverage file recommendation system, the clustering and filtering functions may be repeated based on evaluation feedback, and parameters may be adjusted in some embodiments.

Figure 1:
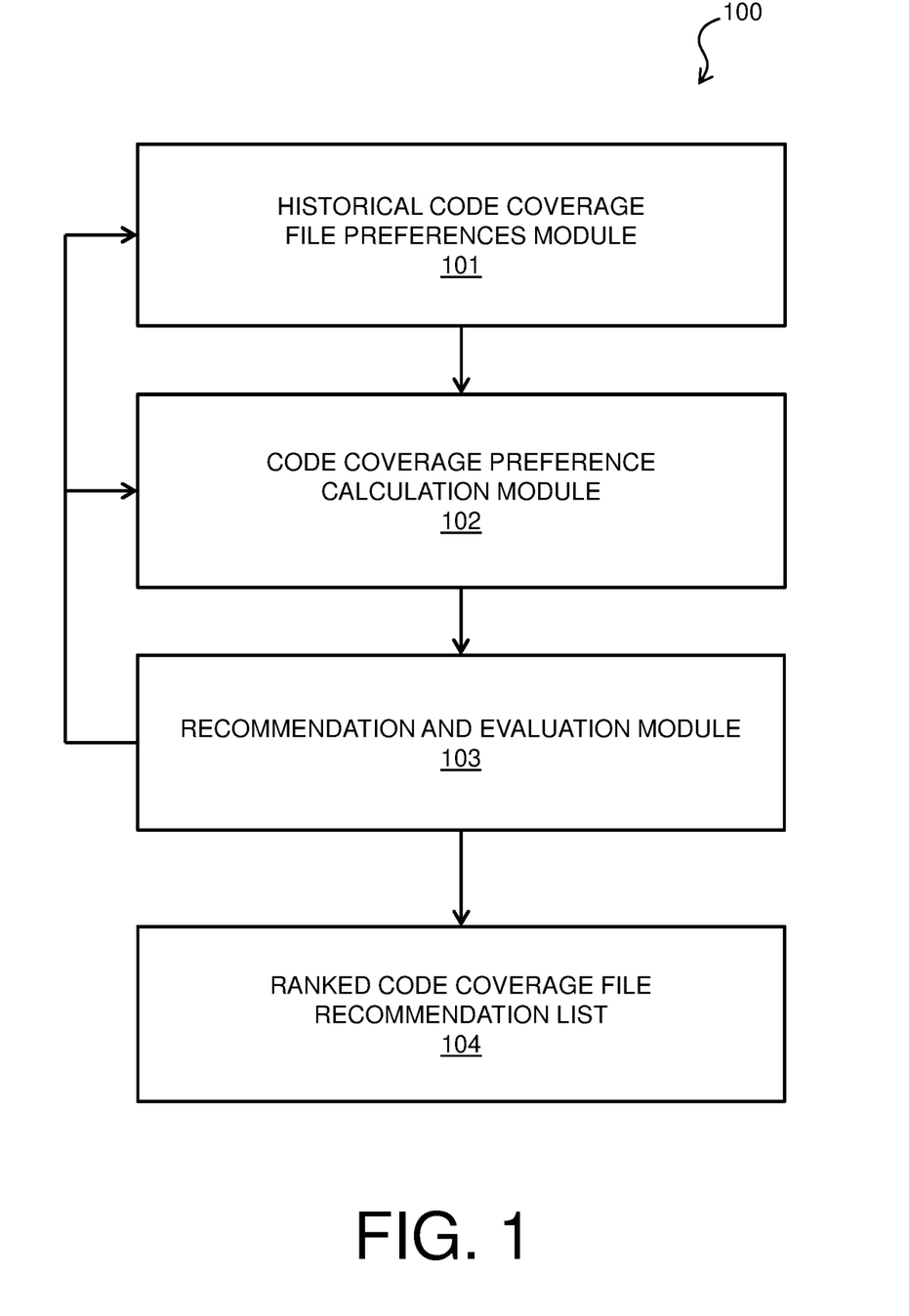
FIG. 1 is a block diagram of components of a system for automatic code coverage file recommendation in accordance with one or more embodiments of the present invention.

Turning now to FIG. 1, system 100 that includes automatic code coverage file recommendation is generally shown in accordance with one or more embodiments of the present invention. System 100 may be implemented in conjunction with any appropriate computer system, such as computer system 700 of FIG. 7. System 100 may be implemented in conjunction with a source code coverage analysis tool that is used for development of a software project (for example, an enterprise software project) in a continuous integration environment in some embodiments. System 100 includes a historical code coverage file preferences module 101. Historical code coverage file preferences module 101 receives historical data, including historical code coverage file information and historical developer profile information, and performs clustering on the historical data to determine historical code coverage file preference data. Historical code coverage file preferences module 101 is discussed in further detail with respect to system 200 of FIG. 2.

The historical code coverage file preference data from historical code coverage file preferences module 101 is provided to code coverage preference calculation module 102. Code coverage preference calculation module 102 determines a code coverage file recommendation list based on receiving new code coverage files and new developer profiles. The recommendation list may be determined based on a combination of collaborative filtering and content filtering that are applied to the historical code coverage file preference data. The user may analyze and/or verify any or all code coverage files in the ranked code coverage file recommendation list 104 as part of the development processes of a software project associated with the user. Code coverage preference calculation module 102 is discussed in further detail below with respect to system 300 of FIG. 3.

A combined code coverage file recommendation list from code coverage preference calculation module 102 is provided to recommendation and evaluation module 103. Recommendation and evaluation module 103 may rank the combined code coverage file recommendation list, and provide the ranked code coverage file recommendation list 104 to a user. In some embodiments, recommendation and evaluation module 103 may also evaluate the performance of system 100 based on the ranked code coverage file recommendation list 104, and provide feedback to a ranking module in recommendation and evaluation module 103; clustering modules in historical code coverage file preferences module 101; and/or filtering modules in code coverage preference calculation module 102 in order to improve the performance of system 100. Recommendation and evaluation module 103 is discussed in further detail below with respect to FIG. 4. System 100 may operate continuously in conjunction with a source code coverage analysis tool to provide respective, updated ranked code coverage file recommendation lists 104 to users of a source code coverage analysis tool.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
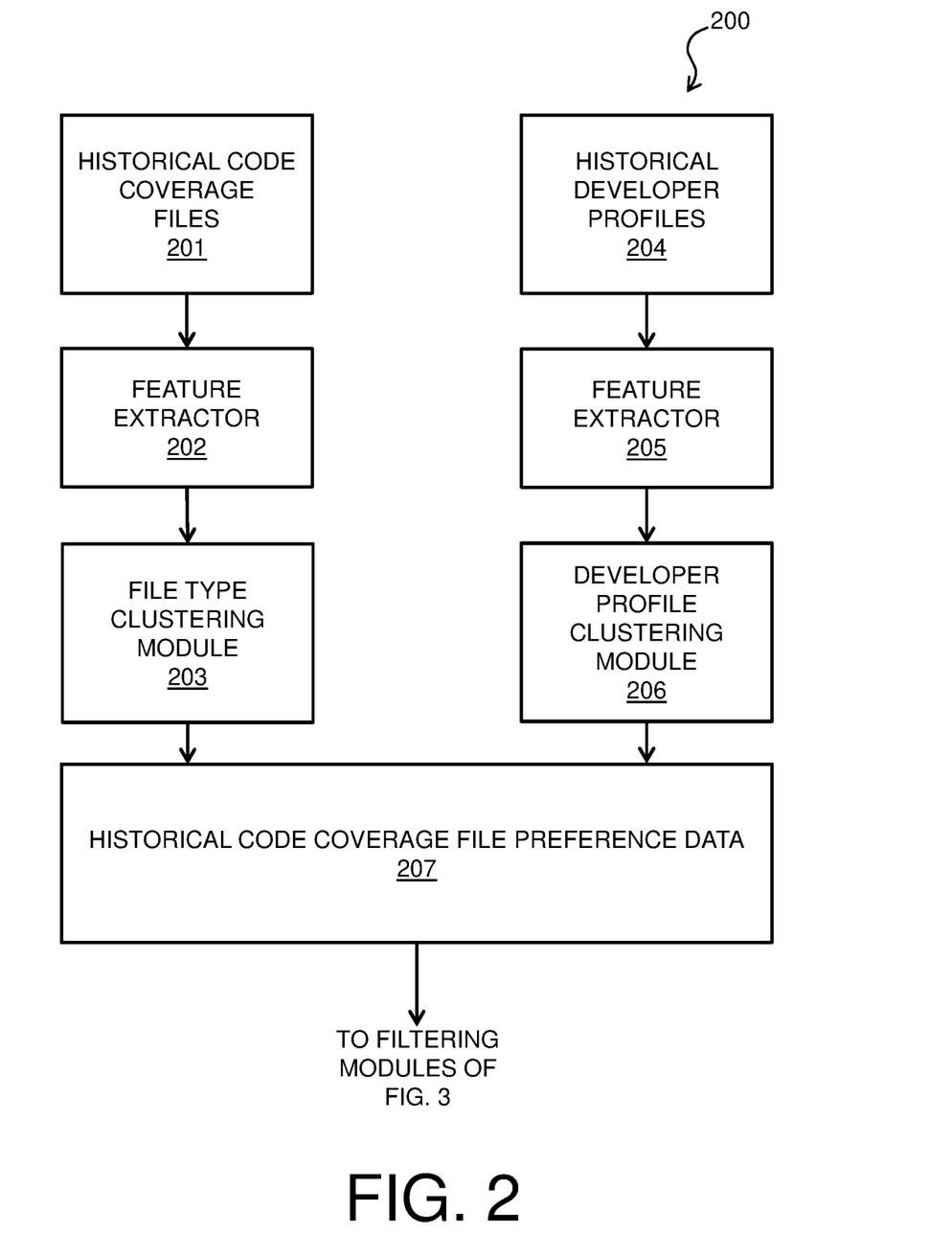
FIG. 2 is a block diagram of components of a system for historical code coverage file preferences for automatic code coverage file recommendation in accordance with one or more embodiments of the present invention.

FIG. 2 shows a system 200 for historical code coverage file preferences for automatic code coverage file recommendation in accordance with one or more embodiments of the present invention. System 200 may be implemented in embodiments of historical code coverage file preferences module 101 of system 100 of FIG. 1. System 200 receives historical data including historical code coverage files 201 and historical developer profiles 204. The historical code coverage files 201 are input into feature extractor 202, which determines a feature vector for each code coverage file of historical code coverage files 201. The feature vectors from feature extractor 202 are input into file type clustering module 203. The file type clustering module 203 may cluster the historical code coverage files 201 based on any appropriate criteria, including but not limited to business use, function types, syntax similarities, and semantic similarities. The clustered historical code coverage file type information from file type clustering module 203 is stored in historical code coverage file preference data 207. The features of the historical code coverage files 201 may be extracted in any appropriate manner by feature extractor 202 for use by the file type clustering module 203; for example, in some embodiments, TF-IDF may be used to encode text documents corresponding to code coverage data in multi-dimensional Euclidian space for clustering analysis by file type clustering module 203. Static analysis rules may be used by embodiments of feature extractor 202 to analyze patterns of source code to generate feature vectors. File type clustering module 203 is discussed in further detail below with respect to FIG. 5.

Historical developer profiles 204 are input into feature extractor 205, which determines a respective feature vector for each developer profile of historical developer profiles 204. Historical developer profiles 204 may include any appropriate developer information, including but not limited to job role (e.g., developer, tester, DevOps, manager, quality assurance), experience (e.g., junior or senior), team responsibility (e.g., security programmer or architect), departments, projects, most familiar programing language(s), and historical code coverage file preferences. The feature vectors from feature extractor 205 are input into developer profile clustering module 206. The developer profile clustering module 206 may cluster the historical developer profiles 204 based on any appropriate criteria in various embodiments. The clustered developer profile information from developer profile clustering module 206 is stored in historical code coverage file preference data 207. Developer profile clustering module 206 is discussed in further detail below with respect to FIG. 6.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
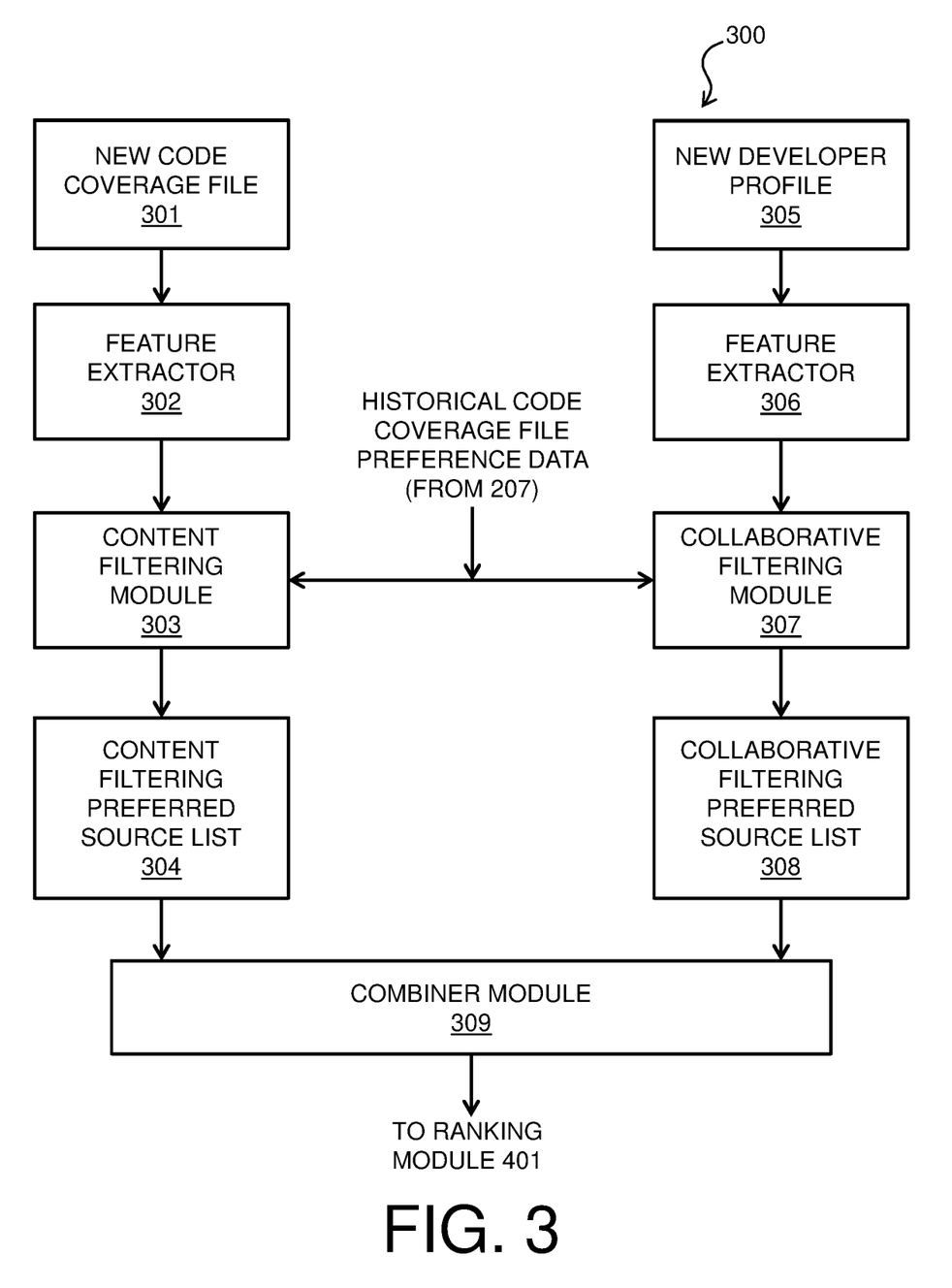
FIG. 3 is a block diagram of components of a system for code coverage preference calculation for automatic code coverage file recommendation in accordance with one or more embodiments of the present invention.

FIG. 3 shows a system 300 for code coverage preference calculation for automatic code coverage file recommendation in accordance with one or more embodiments of the present invention. System 300 may be implemented in embodiments of code coverage preference calculation module 102 of system 100 of FIG. 1. During operation, system 300 may receive a new code coverage file 301, which may be generated by a build of a software project. The new code coverage file 301 may be input into feature extractor 302, which may output a feature vector of the new code coverage file 301 to content filtering module 303. Feature extractor 302 may correspond to feature extractor 202 of FIG. 2. Content filtering module 303 may identify, based on the clustered historical code coverage file type information in historical code coverage file preference data 207 from system 200 of FIG. 2, a content filtering preferred file list 304 that includes a list of code coverage files that are similar to the new code coverage file 301. The content filtering preferred file list 304 is input into combiner module 309. Content filtering module 303 is discussed below in further detail with respect to method 500 of FIG. 5.

During operation, system 300 may also receive a new developer profile 305. The new developer profile 305 may be input into feature extractor 306, which may output feature vector corresponding to the new developer profile 305 to collaborative filtering module 307. Feature extractor 306 may correspond to feature extractor 205 of FIG. 2. Collaborative filtering module 307 may identify, based on the clustered developer profile information in historical code coverage file preference data 207 from system 200 of FIG. 2, a collaborative filtering preferred file list 308 that includes a list of code coverage files corresponding to historical code coverage file preferences of developers that are similar to the new developer profile 305. The collaborative filtering preferred file list 308 is input into combiner module 309. Any appropriate collaborative filtering algorithm may be implemented in collaborative filtering module 307, including but not limited to KNN recommendation algorithms and association rule mining. Collaborative filtering module 307 is discussed below in further detail with respect to method 600 of FIG. 6.

In some embodiments, for each user of the system 100, two preferred file lists 304 and 308 may be maintained by system 300. In some embodiments, during operation of system 100 of FIG. 1, whenever a new code coverage file 301 is received, the content filtering preferred file list 304 is updated and provided to combiner module 309. In some embodiments, during operation of system 100 of FIG. 1, whenever a new developer profile 305 is received, the collaborative filtering preferred file list 308 is updated and provided to combiner module 309. The combiner module 309 generates a combined code coverage file recommendation list based on the two preferred file lists 304 and 308; the combined code coverage file recommendation list is provided to the recommendation and evaluation module 103 of FIG. 1.

It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., additional memory components, embedded controllers, functional blocks, connections between functional blocks, modules, inputs, outputs, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
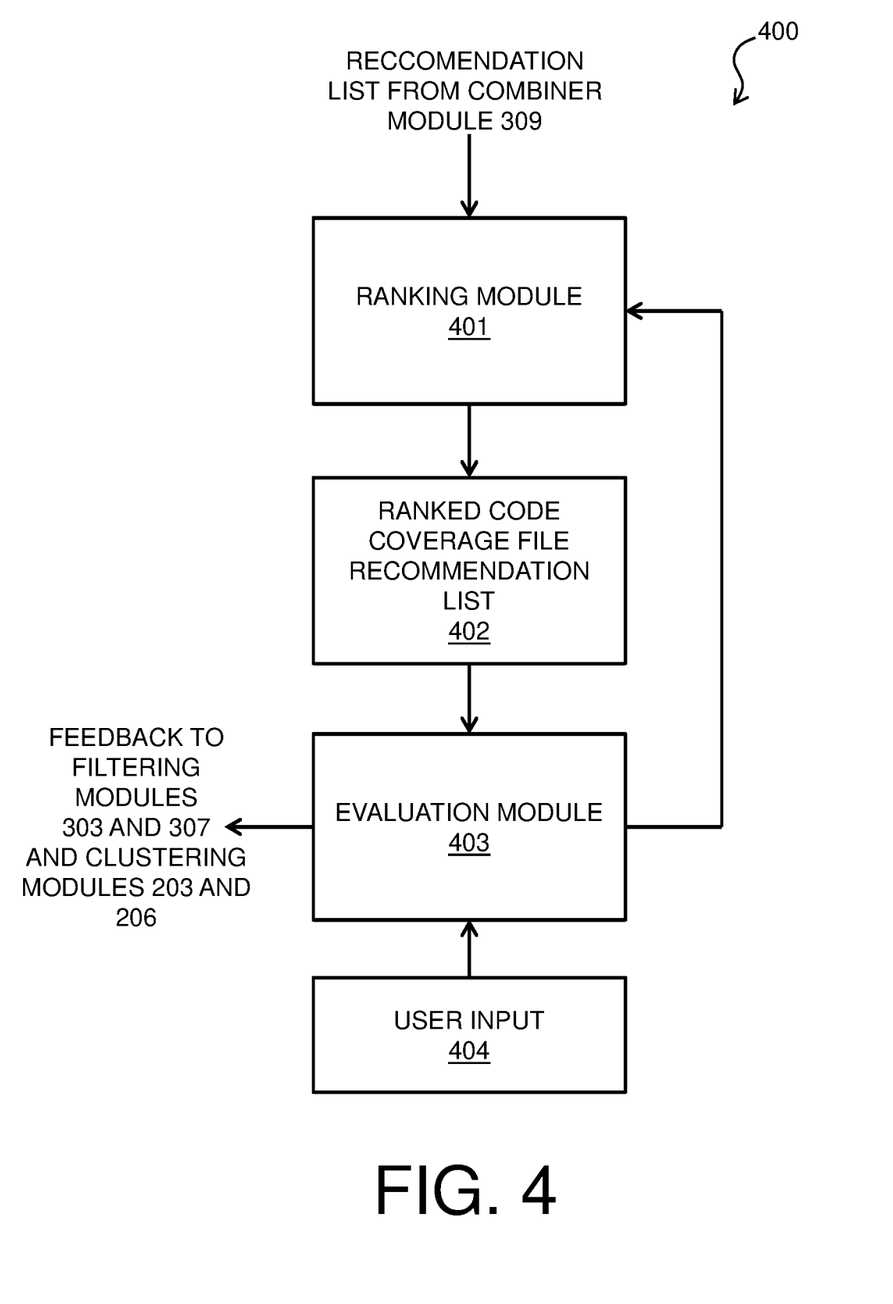
FIG. 4 is a block diagram of components of a system for recommendation and evaluation for automatic code coverage file recommendation in accordance with one or more embodiments of the present invention.

FIG. 4 shows a system 400 that for recommendation and evaluation for automatic code coverage file recommendation in accordance with one or more embodiments of the present invention. System 400 may be implemented in embodiments of recommendation and evaluation module 103 of system 100 of FIG. 1. Ranking module 401 receives combined code coverage file recommendation list from combiner module 309 of system 300 of FIG. 3, and determines a ranked code coverage file recommendation list 402 that is provided to a user, corresponding to ranked code coverage file recommendation list 104 of system 100 of FIG. 1. Ranking module 401 may implement any appropriate weighting or voting scheme in various embodiments. Ranking module 401 may determine preference scores for each code coverage file in the ranked code coverage file recommendation list 402, and rank the code coverage files based on their respective preference scores, in some embodiments. The weights of ranking module 401 may be learned dynamically during operation of system 100 of FIG. 1 in some embodiments.

The ranked code coverage file recommendation list 402 is also provided to evaluation module 403. Evaluation module 403 evaluates the performance of the system 100 of FIG. 1 based on the ranked code coverage file recommendation list 402. The performance evaluation may be made based on user input 404. For example, user input 404 may indicate that a file that was included in ranked code coverage file recommendation list 402 is incorrect. Evaluation module 403 may provide feedback to ranking module 401, filtering modules 303 and 307 of system 300 of FIG. 3, and/or clustering modules 203 and 206 of system 200 of FIG. 2. The feedback from evaluation module 403 may modify any appropriate parameters of the ranking, clustering, and filtering modules. In some embodiments, in order to improve the performance of the system 100 of FIG. 1, the clustering and filtering functions described with respect to FIGS. 2 and 3 may be repeated based on the evaluation feedback from evaluation module 403, and parameters of the clustering and filtering functions may be adjusted in any appropriate manner based on the evaluation feedback from evaluation module 403.

It is to be understood that the block diagram of FIG. 4 is not intended to indicate that the system 400 is to include all of the components shown in FIG. 4. Rather, the system 400 can include any appropriate fewer or additional components not illustrated in FIG. 4 (e.g., additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 5:
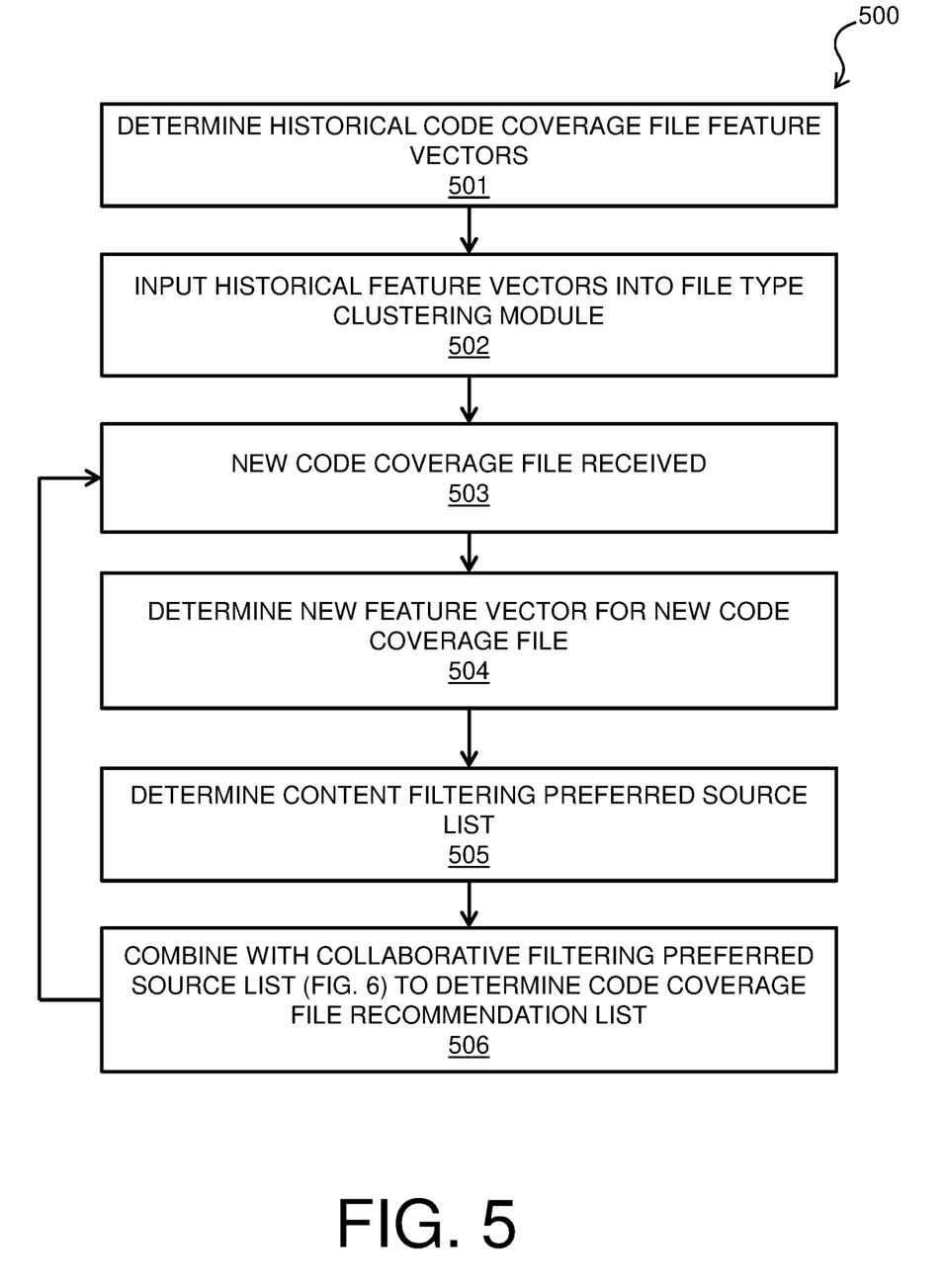
FIG. 5 is a flow diagram of a process for content filtering based automatic code coverage file recommendation in accordance with one or more embodiments of the present invention.

FIG. 5 shows a process flow diagram of a method 500 for content filtering based automatic code coverage file recommendation in accordance with one or more embodiments of the present invention. Method 500 may be implemented in embodiments of system 100 of FIG. 1, and is discussed with reference to FIGS. 1-4. In block 501, feature vectors are determined for each code coverage file of a set of historical code coverage files 201 by a feature extractor 202. The historical code coverage files that are received in block 501 may each including any appropriate information, including but not limited to a defined function type (e.g., model or log), syntax structure, semantic structure, code coverage percentage, and included business rules in various embodiments. For example, a feature vector for an example Code Coverage File A may include [Function Type, Syntax Structure, Semantic Structure].

In block 502, the set of historical code coverage files 201 are clustered based on the determined feature vectors by a file type clustering module 203. The file type clustering module 203 may identify similarities between code coverage files in the historical code coverage files 201. An example embodiment of blocks 501 and 502 for a set of code coverage files A, B, and C may be illustrated as follows: Code Coverage A, B, C→Feature Extractors→Feature Vectors→Code Coverage Content Clustering→Code Coverage Clustering Model.

In block 503, a new code coverage file 301 is received. The new code coverage file 301 may have been generated by a new build of a software project in a continuous integration environment in some embodiments. In block 504, a new feature vector is determined for the new code coverage file by a feature extractor 302. In block 505, a content filtering preferred file list 304 is determined by content filtering module 303 based on the feature vector of the new code coverage file 301 and the clustered historical code coverage file data that was generated in block 502. In block 506, a ranked code coverage file recommendation list 104 is determined based on combining the content filtering preferred file list 304 and a current version of collaborative filtering preferred file list 308, which is maintained according to method 600 of FIG. 6. An example embodiment of blocks 503-506 for a new code coverage file D may be illustrated as follows: Code Coverage D→Feature Extractor→Feature Vector→Code Coverage Content Clustering Model→Recommend Code Coverage Files List and Ranking Scores.

Blocks 503-506 may be repeated throughout operation of system 100 of FIG. 1. For example, in some embodiments, whenever a new code coverage file 301 is received, blocks 503-506 may be performed for the new code coverage file 301. In subsequent iterations of blocks 503-506, a code coverage file that was previously processed according to blocks 503-506 may be included in the clustered code coverage file data that is used to process a new code coverage file 301.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
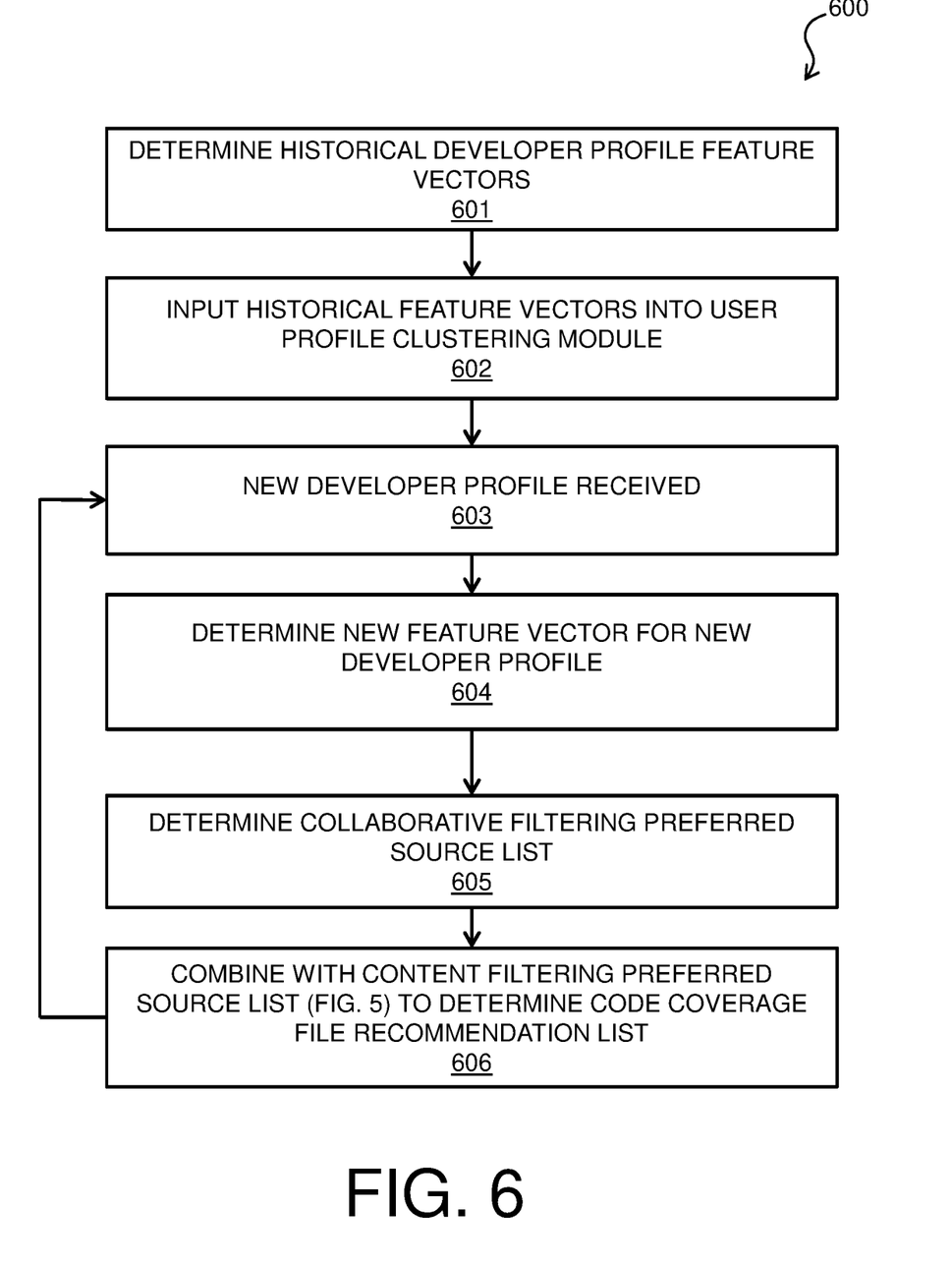
FIG. 6 is a flow diagram of a process for collaborative filtering based automatic code coverage file recommendation in accordance with one or more embodiments of the present invention.

FIG. 6 shows a process flow diagram of a method 600 for collaborative filtering based automatic code coverage file recommendation in accordance with one or more embodiments of the present invention. Method 600 may be implemented in embodiments of system 100 of FIG. 1, and is discussed with reference to FIGS. 1-4. In block 601, feature vectors are determined for each developer profile of a set of historical developer profiles 204 by a feature extractor 205. The historical developer profiles that are received in block 601 may each including any appropriate information, including but not limited to a defined role, responsibility, division, experience, and a preferred code coverage files dataset in various embodiments. For example, a feature vector for an example Developer Profile A may include [Developer, Junior, Security Programmer, Code Coverage File Preference Dataset].

In block 602, the set of historical developer profiles 204 are clustered based on the determined feature vectors by a developer profile clustering module 206. The developer profile clustering module 206 may identify similarities between developer profiles in the historical developer profiles 204. An example embodiment of blocks 601 and 602 for a set of developer profiles A, B, and C may be illustrated as follows: User A, B, C→Feature Extractor→Feature Vectors→Profile Clustering→Profile Clustering Collaborative Model.

In block 603, a new developer profile 305 is received. The new developer profile 305 may be generated based on a new user being added to a continuous integration environment in some embodiments. An example new developer profile that may be received in block 305 may include User D: [Tester, Senior, Quality Assurance]. In block 604, a new feature vector is determined for the new developer profile by a feature extractor 306. In block 605, a collaborative filtering preferred file list 308 is determined by collaborative filtering module 307 based on the feature vector of the new developer profile 305 and the clustered historical developer profile data that was determined in block 602. The collaborative filtering preferred file list 308 may be determined based on the preferred code coverage files datasets of any developers that were determined to be similar to the user in some embodiments. In block 606, a ranked code coverage file recommendation list 104 is determined based on combining the collaborative filtering preferred file list 308 and a current version of content filtering preferred file list 304, which is maintained according to method 500 of FIG. 5. An example embodiment of blocks 603-606 for a new developer profile may be illustrated as follows: User D→Feature Extractor→ Feature Vectors→User Clustering Collaborative Model→ Preferred Code Coverage Files and Preference Scores.

Blocks 603-606 may be repeated throughout operation of system 100 of FIG. 1. For example, in some embodiments, whenever a new developer profile 305 is received, blocks 603-606 may be performed for the new developer profile 305. In subsequent iterations of blocks 603-606, a developer profile that was previously processed according to blocks 603-606 may be included in the clustered code coverage file data that is used to process a new developer profile 305.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
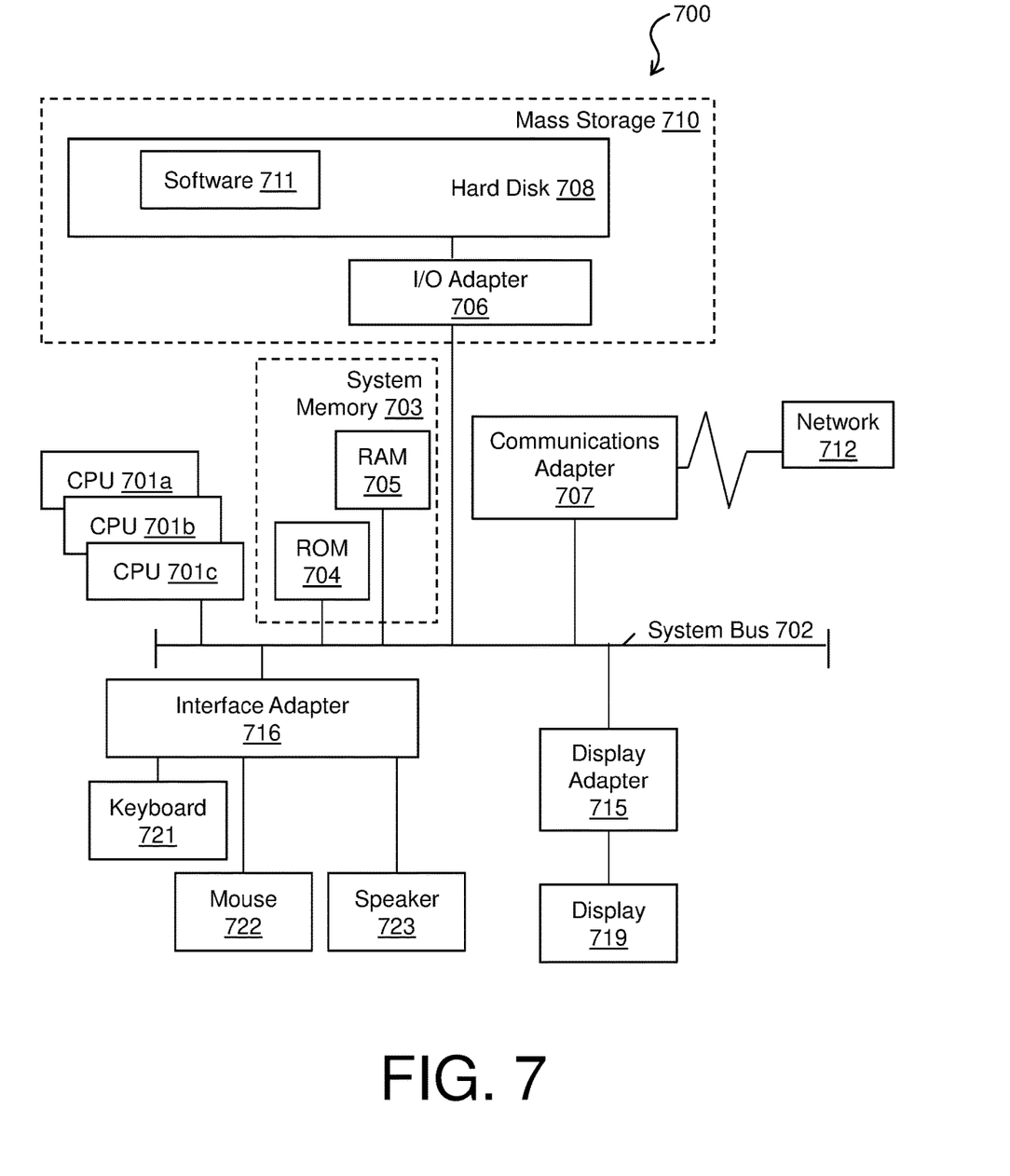
FIG. 7 is a block diagram of an example computer system for use in conjunction with one or more embodiments of automatic code coverage file recommendation.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, historical code coverage data;
clustering the historical code coverage data;
performing content filtering based on the clustered historical code coverage data to determine a content filtering preferred file list;
performing collaborative filtering based on the clustered historical code coverage data to determine a collaborative filtering preferred file list;
combining the content filtering preferred file list and the collaborative filtering preferred file list to determine a code coverage file recommendation list; and
providing the code coverage file recommendation list to a user.

2. The method of claim 1, wherein the historical code coverage data comprises historical code coverage file data; and
wherein clustering the historical code coverage file data comprises:
extracting a respective feature vector for each of a plurality of code coverage files of the historical code coverage file data; and
clustering the plurality of code coverage files based on the extracted respective feature vectors.

3. The method of claim 2, wherein performing content filtering based on the clustered historical code coverage data to determine the content filtering preferred file list comprises:
receiving a new code coverage file;
extracting a new feature vector corresponding to the new code coverage file; and
identifying a subset of the plurality of code coverage files for inclusion in the content filtering preferred file list based on the new feature vector.

4. The method of claim 1, wherein the historical code coverage data comprises historical developer profile data; and
wherein clustering the historical developer profile data comprises:
extracting a respective feature vector for each of a plurality of developer profiles of the historical developer profile data; and
clustering the plurality of developer profiles based on the extracted respective feature vectors.

5. The method of claim 4, wherein performing collaborative filtering based on the clustered historical code coverage data to determine the collaborative filtering preferred file list comprises:
receiving a new developer profile;
extracting a new feature vector corresponding to the new developer profile;
identifying a subset of the plurality of developer profiles based on the new feature vector; and
identifying a plurality of code coverage files for inclusion on the collaborative filtering preferred file list based on the identified subset of the plurality of developer profiles.

6. The method of claim 1, wherein the code coverage file recommendation list is ranked before providing the code coverage file recommendation list to a user, and further comprising:

evaluating the ranking based on user input; and
updating at least one weight associated with the ranking based on the evaluation.

7. The method of claim 1, wherein the user performs verification of a build of a software project based on at least one code coverage file from the code coverage file recommendation list.

8. A system comprising:
a memory having computer readable instructions; and
one or more processors for executing the computer readable instructions, the computer readable instructions controlling the one or more processors to perform operations comprising:
receiving historical code coverage data;
clustering the historical code coverage data;
performing content filtering based on the clustered historical code coverage data to determine a content filtering preferred file list;
performing collaborative filtering based on the clustered historical code coverage data to determine a collaborative filtering preferred file list;
combining the content filtering preferred file list and the collaborative filtering preferred file list to determine a code coverage file recommendation list; and
providing the code coverage file recommendation list to a user.

9. The system of claim 8, wherein the historical code coverage data comprises historical code coverage file data; and
wherein clustering the historical code coverage file data comprises:
extracting a respective feature vector for each of a plurality of code coverage files of the historical code coverage file data; and
clustering the plurality of code coverage files based on the extracted respective feature vectors.

10. The system of claim 9, wherein performing content filtering based on the clustered historical code coverage data to determine the content filtering preferred file list comprises:
receiving a new code coverage file;
extracting a new feature vector corresponding to the new code coverage file; and
identifying a subset of the plurality of code coverage files for inclusion in the content filtering preferred file list based on the new feature vector.

11. The system of claim 8, wherein the historical code coverage data comprises historical developer profile data; and
wherein clustering the historical developer profile data comprises:
extracting a respective feature vector for each of a plurality of developer profiles of the historical developer profile data; and
clustering the plurality of developer profiles based on the extracted respective feature vectors.

12. The system of claim 11, wherein performing collaborative filtering based on the clustered historical code coverage data to determine the collaborative filtering preferred file list comprises:
receiving a new developer profile;
extracting a new feature vector corresponding to the new developer profile;
identifying a subset of the plurality of developer profiles based on the new feature vector; and identifying a plurality of code coverage files for inclusion on the collaborative filtering preferred file list based on the identified subset of the plurality of developer profiles.

13. The system of claim 8, wherein the code coverage file recommendation list is ranked before providing the code coverage file recommendation list to a user, and further comprising:
evaluating the ranking based on user input; and
updating at least one weight associated with the ranking based on the evaluation.

14. The system of claim 8, wherein the user performs verification of a build of a software project based on at least one code coverage file from the code coverage file recommendation list.

15. A computer program product comprising a computer readable storage medium having program instructions embodied therewith, the program instructions executable by one or more processors to cause the one or more processors to perform operations comprising:
receiving historical code coverage data;
clustering the historical code coverage data;
performing content filtering based on the clustered historical code coverage data to determine a content filtering preferred file list;
performing collaborative filtering based on the clustered historical code coverage data to determine a collaborative filtering preferred file list;
combining the content filtering preferred file list and the collaborative filtering preferred file list to determine a code coverage file recommendation list; and
providing the code coverage file recommendation list to a user.

16. The computer program product of claim 15, wherein the historical code coverage data comprises historical code coverage file data; and
wherein clustering the historical code coverage file data comprises:
extracting a respective feature vector for each of a plurality of code coverage files of the historical code coverage file data; and
clustering the plurality of code coverage files based on the extracted respective feature vectors.

17. The computer program product of claim 16, wherein performing content filtering based on the clustered historical code coverage data to determine the content filtering preferred file list comprises:
receiving a new code coverage file;
extracting a new feature vector corresponding to the new code coverage file; and
identifying a subset of the plurality of code coverage files for inclusion in the content filtering preferred file list based on the new feature vector.

18. The computer program product of claim 15, wherein the historical code coverage data comprises historical developer profile data; and
wherein clustering the historical developer profile data comprises:
extracting a respective feature vector for each of a plurality of developer profiles of the historical developer profile data; and
clustering the plurality of developer profiles based on the extracted respective feature vectors.

19. The computer program product of claim 18, wherein performing collaborative filtering based on the clustered historical code coverage data to determine the collaborative filtering preferred file list comprises:
receiving a new developer profile;
extracting a new feature vector corresponding to the new developer profile;
identifying a subset of the plurality of developer profiles based on the new feature vector; and
identifying a plurality of code coverage files for inclusion on the collaborative filtering preferred file list based on the identified subset of the plurality of developer profiles.

20. The computer program product of claim 15, wherein the code coverage file recommendation list is ranked before providing the code coverage file recommendation list to a user, and further comprising:
evaluating the ranking based on user input; and
updating at least one weight associated with the ranking based on the evaluation.

\* \* \* \* \*